United States Patent
Haniya et al.

[11] Patent Number: 5,934,148
[45] Date of Patent: Aug. 10, 1999

[54] WRIST MECHANISM OF INDUSTRIAL ROBOT

[75] Inventors: Kazuhiro Haniya; Shigeo Matsushita, both of Fukuoka, Japan

[73] Assignee: Kabushiki Kaisha Yaskawa Denki, Kitakyushu, Japan

[21] Appl. No.: 08/973,259

[22] PCT Filed: Mar. 10, 1997

[86] PCT No.: PCT/JP97/00746

§ 371 Date: Apr. 2, 1998

§ 102(e) Date: Apr. 2, 1998

[87] PCT Pub. No.: WO97/37817

PCT Pub. Date: Oct. 16, 1997

[30] Foreign Application Priority Data

Apr. 9, 1996 [JP] Japan .................................. 8-113106

[51] Int. Cl.$^6$ .................................................. B25J 17/00
[52] U.S. Cl. ..................................... 74/490.06; 74/490.01; 901/16; 901/26
[58] Field of Search ........................... 74/490.01, 490.03, 74/490.05, 490.06, 412 R, 416, 417, 423; 901/16, 23, 25, 26

[56] References Cited

U.S. PATENT DOCUMENTS

| | | | |
|---|---|---|---|
| 4,576,545 | 3/1986 | Maeda | 901/26 |
| 4,776,232 | 10/1988 | Beyer | 901/26 |
| 4,807,486 | 2/1989 | Akeel et al. | 74/479 |
| 5,456,132 | 10/1995 | Iwanaga et al. | 74/490.06 |

*Primary Examiner*—John A. Jeffery
*Assistant Examiner*—David Fenstermacher
*Attorney, Agent, or Firm*—Morgan, Lewis & Bockius LLP

[57] ABSTRACT

A wrist mechanism of an industrial robot comprises: spline teeth (2A) formed in the outer circumference of the end portion of a bending drive shaft (2) which is provided inside of an arm (1); spline grooves (2B) which are formed in the inner circumference of a first bevel gar (21) and are engaged with the spline teeth (2A); spline teeth (3A) formed in the outer circumference of the end portion of a revolving drive shaft (3); a hollow cylindrical intermediate shaft (30) having one end portion in the inner circumference of which spline grooves (3B), which are engaged with the spline teeth (3A); are formed, and the other end portion to the outer circumference of which a second bevel gear (31) is secured; a bearing (301) through which the one end portion of the intermediate shaft (30) is supported on the first bevel gear (21); and bearings (22 and 24) through which the other end portion of the intermediate shaft (30) is supported on a stationary gear box (45).

7 Claims, 3 Drawing Sheets

WRIST MECHANISM OF INDUSTRIAL ROBOT

TECHNICAL FIELD

This invention relates to a wrist mechanism which is provided, for instance, at the end of an arm of an industrial robot, which performs a biaxial operation such as a bending operation and a revolving operation.

BACKGROUND OF THE INVENTION

A conventional industrial robot is as shown, for instance in FIG. 2. One end of a first arm B is coupled to a base A in such a manner that it is swingable, the other end of the first arm B is coupled to one end of a second arm C in such a manner that the second arm C is swingable. Furthermore, the other end of the second arm C is coupled to a wrist mechanism D in such a manner that the latter D performs a bending operation swinging about an axis perpendicular to the longitudinal axis of the second arm C, and a revolving operation revolving around the longitudinal axis. The wrist mechanism D is coupled to an end effector E comprising a holding device and a machining device.

The wrist mechanism D which is coupled to the end of the arm of an industrial robot, and perform a biaxial operation including a bending operation and a revolving operation is as shown in FIG. 3, and has been disclosed (for instance by Japanese Patent Unexamined Publication No. Sho. 63-185595.

In FIG. 3, reference numeral 1 designates a hollow cylindrical arm; 11, a stationary gear box coupled to the end of the arm 1; and 2, a hollow cylindrical bending drive shaft which is supported in the arm 1 through bearings 12. The end portion of the bending drive shaft 2 is formed into spline teeth 2A. Reference numeral 21 designates a first bevel gear. which has spline grooves 2B in the inner cylindrical surface which are engaged with the spline teeth 2A. The first bevel gear 21 is supported by bearings 22 which are held between the first bevel gear 21 and the stationary gear box 11. The bearings 22 are secured to the arm 1 and the first bevel gear 21 with a bearing retainer 22a and a nut 22b.

Further in FIG. 3, reference numeral 3 designates a revolving drive shaft supported in the drive shaft 2 through bearings 23, and its end portion has spline teeth 3A; 31, a second bevel gear having spline grooves which are engaged with the spline teeth 3A of the revolving drive shaft 3. The second bevel gear 31 is supported by bearings 24 which are fixedly held between the second bevel gear and the stationary gear box 11 with a bearing retainer 32 and a nut 33.

Reference numeral 4 designates a bending drive speed reducer whose stationary portion is secured to the stationary gear box 11. The bending drive speed reducer 4 has an input shaft 42 and an output member 43 which are coaxially turned around an axis which is perpendicular to the direction of axis of the bending drive shaft 2. A third bevel gear 44 engaged with the first bevel gear 21 is fixedly secured to the input shaft 42, while a movable gear box 45 is secured to the output member 43.

Reference numeral 5 designates a first intermediate bevel gear which is turned around the same axis as the output member 43 of the speed reducer 4, and is engaged with the second bevel gear 31. The first intermediate bevel gear 5 has a spur gear 51 mounted on its axis, and is supported by bearings 14 through a housing 13 secured to the arm 1. Reference numeral 15 designates a bearing which supports the movable gear box 45 to allow the housing 13 to perform a bending operation. Reference numeral 6 designates a second intermediate bevel gear which is supported to a movable gear box 45 in parallel with the first intermediate bevel gear with the aid of bearings 46, and is secured to a spur gear 61 which is engaged with the spur gear 51. Reference numeral 7 denotes a revolving speed reducer, and its stationary section 72 is secured to the movable gear box 45 so that its input shaft 71 is coaxial with the revolving drive shaft 3. A fourth bevel gear 73 engaged with the second intermediate bevel gear 6 is secured to the input shaft 71, and an end effector 8 is secured to an output member 74.

In the above-described prior art, the second bevel gear 31 is supported, in a cantilever mode, to the stationary gear box 11 by means of the bearings 24, while torque is transmitted from the revolving drive shaft 3 to the second bevel gear 31 by the engagement of the spline teeth 3A of the revolving drive shaft 31 with the spline grooves 3B of the bevel gear 3. Hence, there is a radial gap between the revolving drive shaft 3 and the second bevel gear 31.

Therefore, the supporting portion of the second bevel gear 31 is decreased in rigidity, which produces vibration or noise, or lowers transmission efficiency.

In the case where the second bevel gear 31 is supported, in a cantilever mode, in the stationary gear box 11, in order to prevent the decrease of rigidity thereof, it is necessary to provide a number of bearing fixing components such as a sleeve and a nut, which makes it difficult to reduce the manufacturing cost.

Furthermore, in the prior art, the revolving drive shaft 3 is supported through the bearings 23 in the bending drive shaft 2. Hence, it is necessary to support the bending drive shaft 2 in the arm 1 through the bearings 12, thereby to increase the rigidity of the bending drive shaft 2, which increases the number of bearings.

The first bevel gear 21 is supported by the bearings 22 which are fixed to the arm 1 and the first bevel gear 21 with the bearing retainer 22a and the nut 22b; that is, it is supported in a cantilever mounted mode, and the number of components is increased.

SUMMARY OF THE INVENTION

Accordingly, an object of the invention is to provide a wrist mechanism for an industrial robot in which the generation of vibration or noise is effectively prevented, and both the number of manufacturing steps and the number of components are reduced.

The foregoing object has been achieved by the provision of a wrist mechanism of an industrial robot comprising:

a hollow cylindrical arm;

a stationary gear box coupled to the end of the said arm;

a hollow cylindrical bending drive shaft which is provided inside the arm, and is supported through a bearing by the stationary gear box;

spline teeth formed in the end portion of the bending drive shaft;

a first bevel gear having spline grooves inside thereof which are engaged with the spline teeth;

a revolving drive shaft which is provided inside of the bending drive shaft;

a second bevel gear which is driven by the revolving drive shaft, and is arranged in the stationary gear box;

a bending speed reducer which includes a stationary section secured to the stationary gear box, and an input shaft and an output member which are rotatable around an axis which is perpendicular to the axis of the bending drive shaft;

a third bevel gear which is secured to the input shaft of the bending speed reducer, and is engaged with the first bevel gear;

a first intermediate bevel gear supported by a bearing through a housing which is secured to the arm so that the first intermediate bevel gear is turned coaxially with the bending speed reducer, and is engaged with the second bevel gear;

a movable gear box which is secured to the output member of the bending speed reducer, and is supported by the housing in such a manner that the movable gear box is able to perform a bending operation;

a second intermediate bevel gear which is supported through a bearing by the movable gear box in such a manner that the second intermediate bevel gear is in parallel with the first intermediate bevel gear, and is coupled through torque transmitting means to the first intermediate bevel gear;

a revolving speed reducer secured to the movable gear box; and a fourth bevel gear which is secured to the input shaft of the revolving speed reducer, and is engaged with the second intermediate bevel gear, wherein the wrist mechanism further comprises:

spline teeth formed in the outer cylindrical surface of the end portion of the revolving drive shaft;

a hollow cylindrical intermediate shaft having one end portion in the inner circumference of which spline grooves, which are engaged with the spline teeth of the revolving drive shaft, are formed, and the other end portion to the outer circumference of which the second bevel gear is secured;

a bearing which supports the one end portion of the intermediate shaft inside of the first bevel gear; and a bearing which supports the other end portion of the intermediate shaft on the stationary gear box.

In the wrist mechanism, the first bevel gear is supported, through the intermediate shaft and the bearing which supports the one end portion of the intermediate shaft inside of the first bevel gear, by a straddle mounted structure which is formed by the bearing supporting the other end portion of the intermediate shaft and by the bearing supporting the outer circumference of the first bevel gear on the stationary gear box.

Furthermore, in the wrist mechanism, the stationary gear box is integral with the arm.

Moreover, in the wrist mechanism, the revolving speed reducer is offset from the revolving drive shaft.

BEST MODE FOR CARRYING OUT THE INVENTION

A preferred embodiment of the invention will be described with reference to the accompanying drawings.

Figure 1:
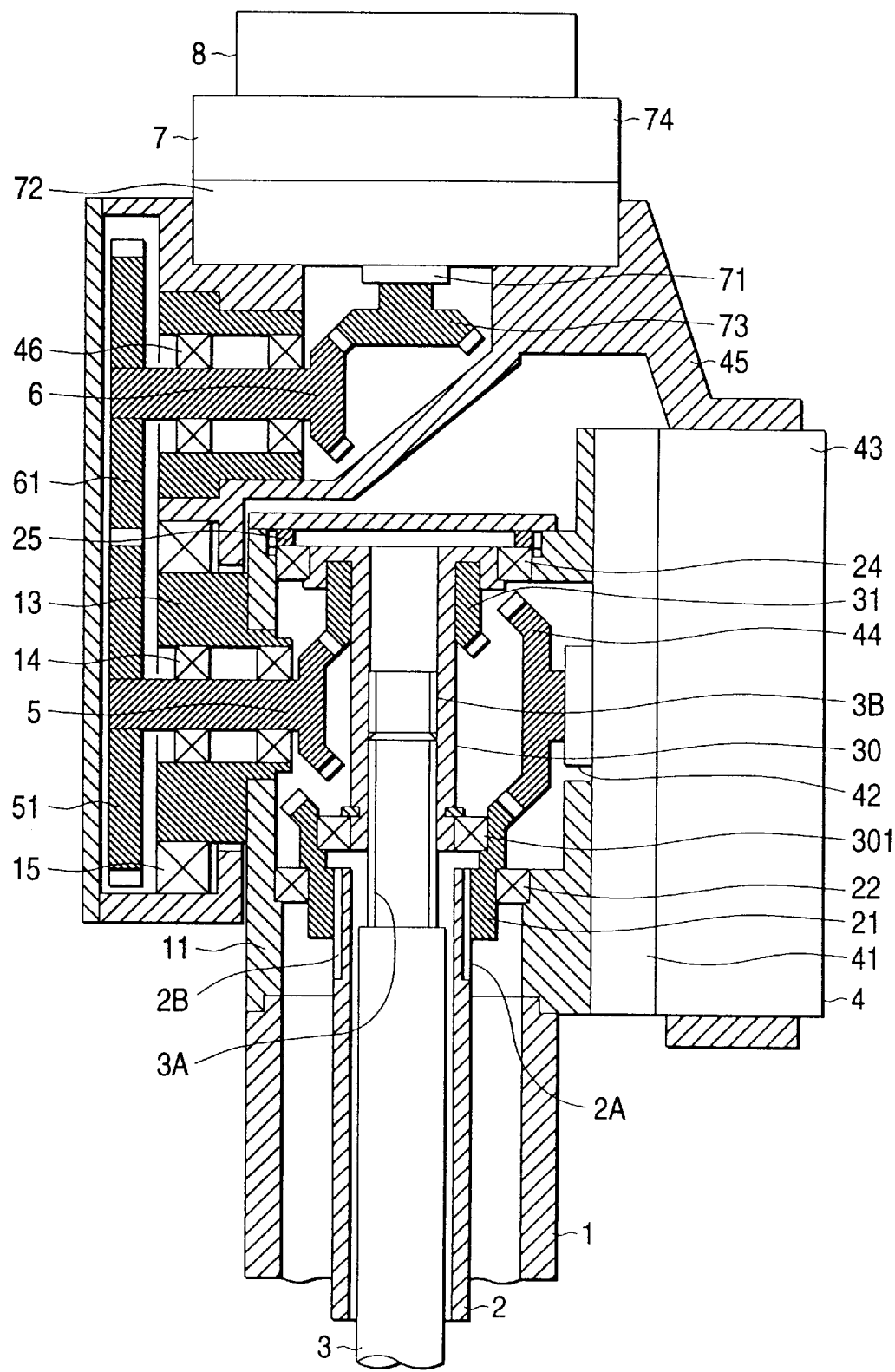
FIG. 1 is a sectional front view of a wrist showing an embodiment of the invention.
Figure 2:
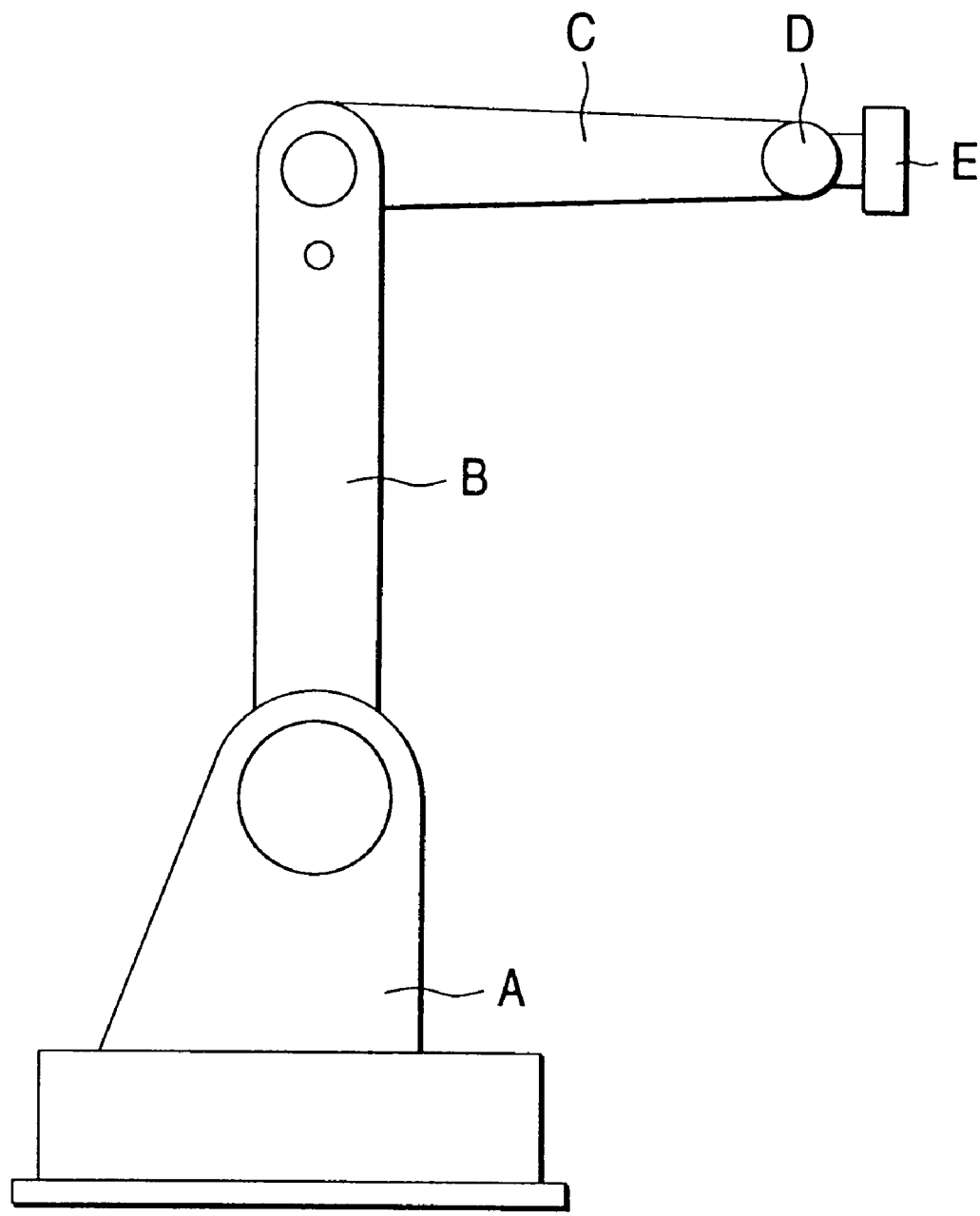
FIG. 2 is a side view of an industrial robot.

FIG. 1 is a sectional front view of a wrist mechanism of an embodiment of the invention. The total arrangement of the industrial robot is substantially equal to that shown in FIG. 2 which has been described with respect to the prior art.

In FIG. 1, reference numeral 1 designates a cylindrical hollow arm; 11, a stationary gear box coupled to the end of the arm 1; and 2, a hollow cylindrical bending drive shaft which is provided in the arm 1, and has spline teeth 2A in the outer circumference of its end portion. Reference numeral 21 designates a first bevel gear having spline grooves 2B in its inner circumference, which are engaged with the spline teeth 2A of the bending drive shaft 2. The first bevel gear 21 is supported by a bearing 22 provided between the first bevel gear 21 and a stationary gear box 11. Reference numeral 3 designates a revolving drive shaft provided inside the bending drive shaft 2, and has spline teeth 3A in the outer circumference of the end portion.

Reference numeral 30 denotes a hollow cylindrical intermediate shaft, and has spline grooves 3B in its inner circumference which are engaged with the spline teeth 3A. One end portion of the intermediate shaft 30 is supported by a bearing 301 provided between the intermediate shaft and the first bevel gear 21, and the other end portion of the intermediate shaft is supported by a bearing 24 provided between the intermediate shaft and the stationary gear box 11. The bearing 24 is fixed with a nut 25 to the extent that a gap causes no vibration. Reference numeral 31 designates a second bevel gear secured to the other end portion of the intermediate shaft 30.

Accordingly, the second bevel gear 31 secured to the intermediate shaft 30 is supported by the bearing 301 and the bearing 24 in a straddle mounted mode.

Since the bearing 24 is pressed by the nut 25, the bearings 22, 202 and 24 are pre-loaded, and therefore the resultant structure is high in rigidity. Hence, the first bevel gear 21 is supported by the bearing 22 and the bearing 24, having the same effect as in the case of a straddle mounted structure.

Reference numeral 4 designates a bending drive speed reducer whose stationary section 41 is secured to the stationary gear box 11. The speed reduce 4 has an input shaft 42 and an output member 43 which are coaxially turned around an axis which is perpendicular to the axis of the bending drive shaft 2. A third bevel gear 44, which is engaged with the first bevel gear 21, is secured to the input shaft 42. A movable gear box 45 is secured to the output member 43.

Figure 3:
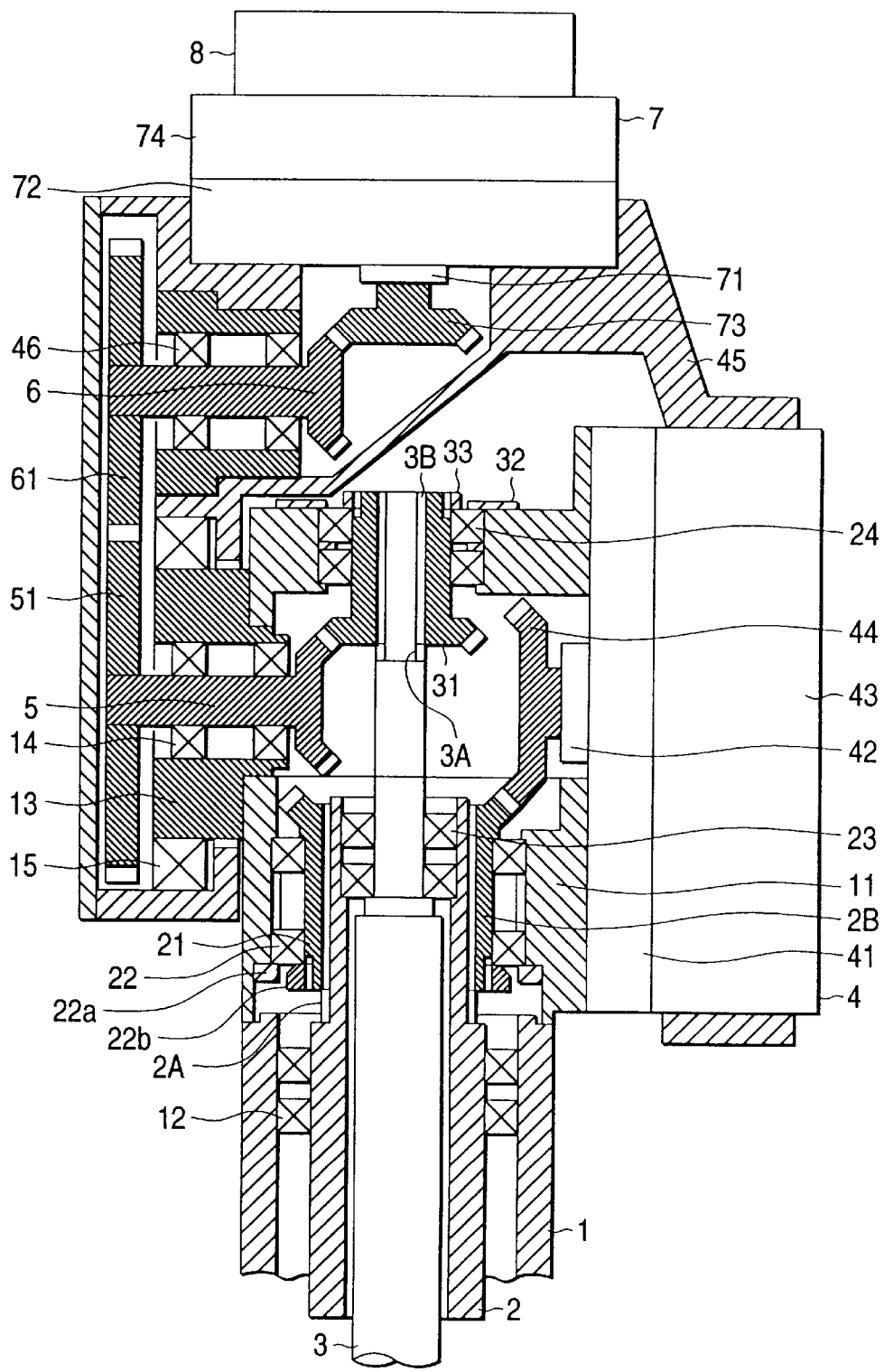
FIG. 3 is a sectional front view of a conventional wrist.

The other arrangements are equal to those which has been described with respect to the prior art shown in FIG. 3. Reference numeral 5 denotes a first intermediate bevel gear which rotates coaxially with the output member 43 of the bending speed reducer 4, and engages with the second bevel gear 31. A spur gear 51 is coaxially secured to the first intermediate bevel gear. The first intermediate bevel gear 5 is supported by bearings 14 through a housing 13 secured to the arm 1. Reference numeral 15 designates a bearing which supports the movable gear box 45 to the housing 13 in such a manner that the movable gear box 45 is able to perform a bending operation.

Reference numeral 6 designates a second intermediate bevel gear which is supported through a bearing 46 by the movable gear box 45 in such a manner that it is in parallel with the first intermediate bevel gear. The second intermediate bevel gear 6 is secured to a spur gear 61 which is engaged with the spur gear 51.

Reference numeral 7 designates a revolving speed reducer, and its stationary section 72 is secured to the movable gear box 45 in such a manner that its input shaft 71 is coaxial with the revolving drive shaft 3. The input shaft 71 has a fourth bevel gear 73 which is engaged with the second intermediate bevel gear 6, and its output member 74 is fixedly coupled to the end effector 8.

As described above, in the wrist mechanism of the invention, the bending drive shaft 2 is coupled through the spline mechanism to the first bevel gear 21, and the revolving drive shaft 3 is coupled to the second bevel gear 31 through the intermediate shaft 30 which is coupled through the spline mechanism to the revolving drive shaft 3.

Hence, the second bevel gear 31 is supported through the intermediate shaft 30 by the bearings 24 and 301 in a straddle mounted mode, and is supported independently of the gap of the coupling region of the spline mechanism. Therefore, the second-bevel-gear supporting structure is considerably high in rigidity, and it is unnecessary to use a number of bearings to suppress the vibration thereof, which reduces the number of components as much.

Owing to the bearings 22 and 24, the first bevel gear 21 has the same effect as the straddle mounted structure. Hence, similarly, the first-bevel-gear supporting structure is considerably high in rigidity, and it is unnecessary to use a number of bearings to suppress the vibration thereof, which reduces the number components as much.

In the above-described embodiment, the arm 1 and the stationary gear box 11 are individual components; however, since the revolving drive shaft 3 is coupled through the spline mechanism to the intermediate shaft 30 which is supported through the bearing 301 in the first bevel gear 21, it is unnecessary for the bending drive shaft 2 to directly support the revolving drive shaft 3. That is, no bearing may be provided between the arm 1 and the bending drive shaft 2. Accordingly, the assembling of the first and second bevel gears 21 and 31 can be made from only the top of the stationary gear box 11, and the stationary gear box 11 may be integrated with the arm 1, which reduces the number of components as much.

In the above-described embodiment, the input shaft 71 of the revolving speed reducer 7 is coaxial with the revolving drive shaft 3; however, the invention is not limited thereto or thereby. That is, the wrist mechanism may be so designed that the input shaft 71 of the revolving speed reducer 7 is not coaxial with or is offset from the revolving drive shaft 3.

As described above, in the present invention, the first bevel gear provided in the mechanism adapted to transmit torque from the bending drive shaft to the bending drive speed reducer, and the second bevel gear provided in the mechanism adapted to transmit torque from the revolving drive shaft to the revolving speed reducer are supported through the intermediate shaft by the two bearings in a straddle mounted mode, and are furthermore supported independently of the gap of the coupling region of the spline mechanism; that is, the supporting mechanisms of the first and second bevel gears are considerably high in rigidity. This feature prevents the wrist mechanism from generating vibration or noise, and decreases the number of manufacturing steps and the number of components thereof.

INDUSTRIAL APPLICATION

This invention is useful for an industrial robot, and particularly for a wrist mechanism of an articulated robot.

What is claimed is:

1. A wrist mechanism of an industrial robot comprising:

a hollow cylindrical arm;

a stationary gear box coupled to an end of said arm;

a hollow cylindrical bending drive shaft which is provided inside said arm, and is supported through a bearing by said stationary gear box;

spline teeth formed in an end portion of said bending drive shaft;

a first bevel gear having spline grooves inside thereof which are engaged with said spline teeth;

a revolving drive shaft which is provided inside of said bending drive shaft;

a second bevel gear which is driven by said revolving drive shaft, and is arranged in said stationary gear box;

a bending speed reducer which includes a stationary section secured to said stationary gear box, and an input shaft and an output member which are rotatable around an axis which is perpendicular to an axis of said bending drive shaft;

a third bevel gear which is secured to said input shaft of said bending speed reducer, and is engaged with said first bevel gear;

a first intermediate bevel gear supported by a bearing through a housing which is secured to said arm so that said first intermediate bevel gear is turned coaxially with said bending speed reducer, and is engaged with said second bevel gear;

a movable gear box which is secured to said output member of said bending speed reducer, and is supported by said housing in such a manner that said movable gear box is able to perform a bending operation;

a second intermediate bevel gear which is supported through a bearing by said movable gear box in such a manner that said second intermediate bevel gear is in parallel with said first intermediate bevel gear, and is coupled through torque transmitting means to said first intermediate bevel gear;

a revolving speed reducer secured to said movable gear box; and a fourth bevel gear which is secured to said input shaft of said revolving speed reducer, and is engaged with said second intermediate bevel gear, where said wrist mechanism further comprises:

spline teeth formed in an outer circumference of an end portion of said revolving drive shaft;

a hollow cylindrical intermediate shaft having one end portion in an inner circumference of which spline grooves, which are engaged with said spline teeth of said revolving drive shaft, are formed, and the other end portion to said outer circumference of which said second bevel gear is secured;

a bearing which supports an one end portion of said intermediate shaft inside of said first bevel gear; and a bearing which supports the other end portion of said intermediate shaft on said stationary gear box.

2. A wrist mechanism of an industrial robot as claimed in claim 1, wherein said first bevel gear is supported, through said intermediate shaft and said bearing which supports the one end portion of said intermediate shaft inside of said first bevel gear, by a straddle mounted structure which is formed by said bearing supporting the other end portion of said intermediate shaft and by a bearing supporting an outer circumference of said first bevel gear on said stationary gear box.

3. A wrist mechanism of an industrial robot as claimed in claim 2, wherein said stationary gear box is integral with said arm.

4. A wrist mechanism of an industrial robot as claimed in claim 2, wherein said revolving speed reducer is offset from said revolving drive shaft.

5. A wrist mechanism of an industrial robot as claimed in claim 1, wherein said revolving speed reducer is offset from said revolving drive shaft.

6. A wrist mechanism of an industrial robot as claimed in claim 1, wherein said stationary gear box is integral with said arm.

7. A wrist mechanism of an industrial robot as claimed in claim 6, wherein said revolving speed reducer is offset from said revolving drive shaft.

* * * * *